(12) United States Patent
Aspen

(10) Patent No.: US 9,316,506 B2
(45) Date of Patent: Apr. 19, 2016

(54) METHOD AND APPARATUS FOR DISPLAYING VERTICAL TERRAIN INFORMATION

(75) Inventor: Sven David Aspen, Sherwood, OR (US)

(73) Assignee: THE BOEING COMPANY, Chicago, IL (US)

(*) Notice: Subject to any disclaimer, the term of this patent is extended or adjusted under 35 U.S.C. 154(b) by 2272 days.

(21) Appl. No.: 12/252,939

(22) Filed: Oct. 16, 2008

(65) Prior Publication Data

US 2010/0100313 A1 Apr. 22, 2010

(51) Int. Cl.
*G01C 21/00* (2006.01)
*G01C 23/00* (2006.01)
*G08G 5/00* (2006.01)

(52) U.S. Cl.
CPC ............ *G01C 23/00* (2013.01); *G01C 21/00* (2013.01); *G08G 5/0021* (2013.01)

(58) Field of Classification Search
CPC ......................................................... G01C 23/00
USPC ........................................ 701/4, 14; 342/974
See application file for complete search history.

(56) References Cited

U.S. PATENT DOCUMENTS

| | | | |
|---|---|---|---|
| 5,828,332 A * | 10/1998 | Frederick | 342/26 B |
| 5,936,552 A * | 8/1999 | Wichgers et al. | 340/963 |
| 6,690,298 B1 * | 2/2004 | Barber et al. | 340/971 |
| 7,477,164 B1 * | 1/2009 | Barber | 340/945 |
| 7,603,209 B2 * | 10/2009 | Dwyer et al. | 701/14 |
| 8,718,915 B1 * | 5/2014 | Turcios | G01C 23/005 342/176 |
| 2006/0004496 A1 * | 1/2006 | Tucker et al. | 701/4 |
| 2006/0250280 A1 * | 11/2006 | Chen et al. | 340/974 |
| 2010/0305783 A1 * | 12/2010 | Tucker et al. | 701/4 |

OTHER PUBLICATIONS

U.S. Appl No. 12/062,949, filed Apr 4. 2008, Aspen.

* cited by examiner

*Primary Examiner* — Jonathan K Ng
(74) *Attorney, Agent, or Firm* — Yee & Associates, P.C.

(57) ABSTRACT

The advantageous embodiments provide a computer implemented method, apparatus, and computer usable program code for presenting terrain along a route of an aircraft. A display of a vertical profile side view of terrain data along the route of the aircraft on an aircraft display is provided. A number of graphical indicators of a position of terrain are displayed on the display relative to the aircraft along the route.

20 Claims, 8 Drawing Sheets

METHOD AND APPARATUS FOR DISPLAYING VERTICAL TERRAIN INFORMATION

BACKGROUND INFORMATION

1. Field

The present disclosure relates generally to an improved data processing system for use in displaying information in a vehicle and in particular to a method and apparatus for displaying information related to an aircraft. Still more particularly, the present disclosure relates to a computer implemented method, apparatus, and computer program code for displaying terrain information for an aircraft.

2. Background

Controlled flight into terrain is an event where an airworthy aircraft under the control of the pilot inadvertently flies into terrain, an obstacle, or water. In these types of accidents, the pilots are generally unaware of the danger until it is too late to avoid the terrain. Pilots with any level of experience, even highly experienced professionals, may be involved in these types of events in which a controlled flight into terrain occurs.

Factors that may cause these types of events include, for example, pilot fatigue. Further, many accidents often involve impact with significantly raised terrain such as hills or mountains. Other times, cloudy, foggy, or other reduced visibility conditions may cause this type of accident.

Typical systems employed in aircraft graphically display terrain on panel displays that depict elevations surrounding the aircraft position. In other words, the currently available displays show the terrain surrounding the aircraft. These types of displays are typically referred to as side views or longitudinal route profile view displays. With these types of systems, pilots and flight crew have improved situational awareness of the terrain around the aircraft. These types of displays, however, do not always provide as much information as may be desired. Thus, it would be advantageous to have a method and apparatus to overcome the problems described above.

SUMMARY

In one advantageous embodiment, a method is presented for presenting terrain along a route of an aircraft. A display of a vertical profile side view of terrain data along the route of the aircraft on an aircraft display is provided. A number of graphical indicators of a position of terrain are displayed on the display relative to the aircraft along the route.

In another advantageous embodiment, a computer program product comprising a computer recordable storage medium and program code, stored on the computer recordable medium, is provided. Program code is present for presenting a display of a vertical profile side view of terrain data along the route of an aircraft on an aircraft display. Program code is also present for displaying a number of graphical indicators of a position of terrain on the display relative to the aircraft along the route.

In still another advantageous embodiment, an apparatus comprises a processor unit, a storage device connected to the processor unit and having a display process stored in the storage device, and a display connected to the processor unit. The processor unit is configured to execute the display process to present a display of a vertical profile side view of terrain along the route of the vehicle on a vehicle display and display a number of graphical indicators of a position of terrain on the display relative to the vehicle along the route.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
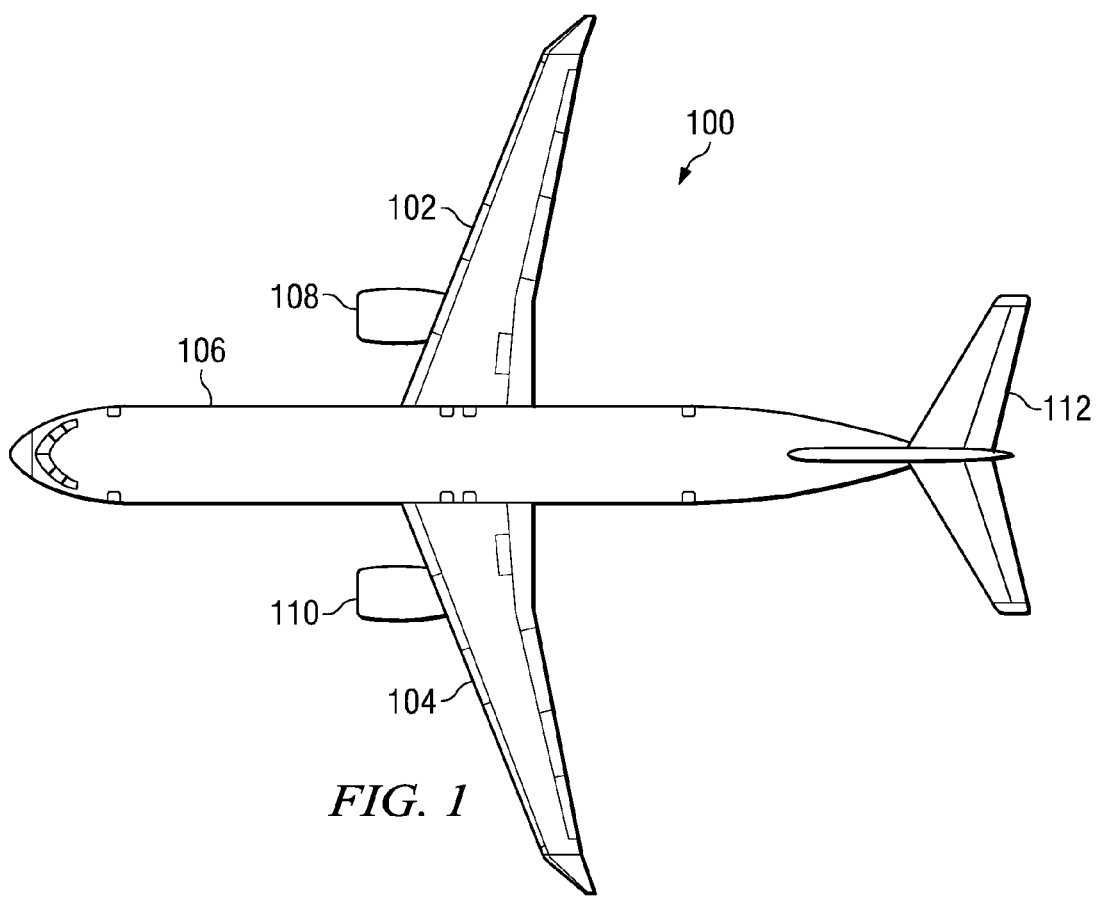
FIG. 1 is a diagram of an aircraft in which an advantageous embodiment may be implemented.

With reference now to the figures, and in particular with reference to FIG. 1, a diagram of an aircraft is depicted in which an advantageous embodiment may be implemented. Aircraft 100 is an example of an aircraft in which a method and apparatus for displaying terrain information may be implemented. In this illustrative example, aircraft 100 has wings 102 and 104 attached to body 106. Aircraft 100 includes wing mounted engine 108, wing mounted engine 110, and tail 112.

The different advantageous embodiments recognize that the information terrain on either side of an aircraft may be especially useful in required navigation performance procedures that may require a more curved or difficult path, or in situations where an aircraft has traveled slightly off-course. The different advantageous embodiments, however, recognize that additional information would provide for increased situational awareness in flying an aircraft.

The different advantageous embodiments simultaneously present a display of a vertical profile side view of terrain along a portion of a route. Further, a two dimensional view of the terrain also is presented. This two dimensional view may be, for example, the currently available top view of the route and/or a side view of the route. Graphical indicators are also displayed that correlate locations between the two dimensional view and the vertical profile side view. These graphical indicators may be for specific distances and specific locations in relation to a side of an aircraft.

The vertical profile side view of the terrain is also referred to as a longitudinal route profile view shown from the side of the aircraft. This view also includes three dimensional information about the terrain on either side of the aircraft. The top view is a view looking down from the aircraft. This view may also be referred to as a bird's eye chart view.

The vertical profile side view, along with the graphical indicators correlating the position of different features in the terrain with other views, provides information needed to increased situational awareness in the different advantageous embodiments. This view also increases the ease and intuitiveness in identifying different features in the terrain that an aircraft is traveling towards.

Figure 2:
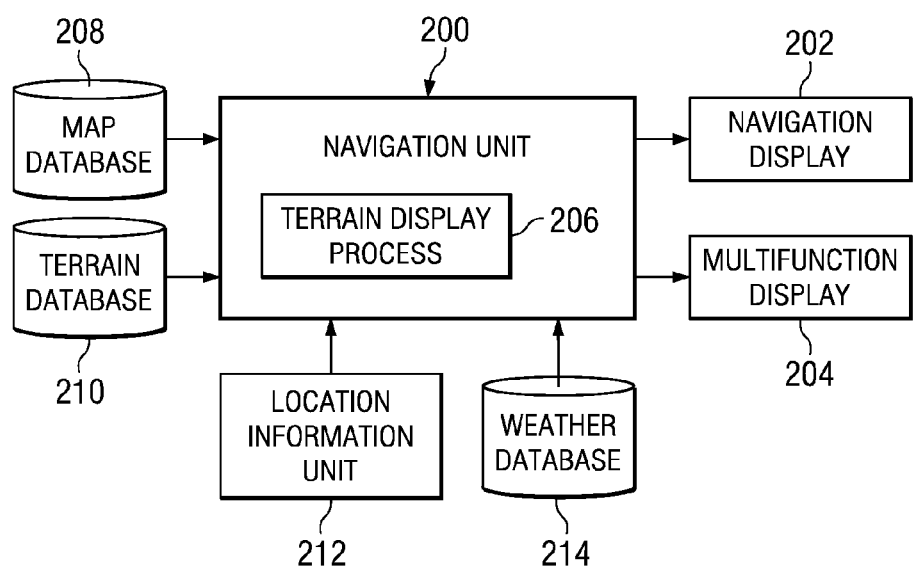
FIG. 2 is a diagram illustrating components used to provide a display of terrain in accordance with an advantageous embodiment.

With reference now to FIG. 2, a diagram illustrating components used to provide a display of terrain is depicted in accordance with an advantageous embodiment. The different components illustrated in FIG. 2 may be implemented in an aircraft, such as aircraft 100 in FIG. 1.

In this example, navigation unit 200 provides a presentation of maps, terrain displays, and other navigation information through navigation display 202 and multifunction display 204. In these examples, navigation display 202 may display information, such as, for example, altitude, air speed, vertical speed, and other data pertaining to the flight. Multifunction display 204 may present information to a pilot in numerous configurable ways. For example, multifunction display 204 may provide a display of terrain in accordance with an advantageous embodiment. In particular, multifunction display 204 may present a two dimensional terrain elevation view generated according to the advantageous embodiments.

In the illustrative examples, terrain display process 206 is a display process that provides a view in which a two dimensional view of terrain along the route is presented. The two dimensional display includes at least one of a top view and a vertical profile side view. In other words, at least one of the top view and the vertical profile side view means that the display may include a top view, a vertical profile side view, or a top view and a vertical profile side view.

Terrain display process 206 may obtain maps of the areas over which the aircraft flies from map database 208. An identification of terrain for those particular areas may be found in terrain database 210.

Map database 208 may be a local database within the aircraft on which navigation unit 200 is located. Alternatively, map database 208 may be a remote database accessed by navigation unit 200 through a communications link, such as a wireless communications link. In a similar fashion, terrain database 210 may be found locally within the aircraft or may be a remote database accessed by navigation unit 200.

In the different illustrative examples, the vertical profile side view along with the other two dimensional views may be displayed by terrain display process 206 in navigation unit 200. In these examples, this information may be displayed in multifunction display 204. In these examples, graphical indictors are overlaid or displayed to correlate locations between the two dimensional view and the vertical profile side view. A number, as used herein, refers to one or more items. For example, a number of graphical indicators is one or more indicators. These indicators are graphical indicators in these examples.

Further, these indicators may be associated with the different distances or locations. In these examples, the graphical indicators may be color coded such that a feature displayed in the vertical profile side view is corresponding to the same feature in the top view through the use of the same color. As a result, these views are similar to those used in engineering drawings that present features of a three-dimensional object using two-dimensional drawings.

In other advantageous embodiments, other graphical indicators may be used. These other graphical indicators include, for example, using a symbol or graphical indicator to correlate the positions. The examples are alternatives to the color coded cross section lines.

The location of the aircraft relative to the map may be identified using location information unit 212. Location information unit 212 may take different forms depending on the particular implementation. For example, location information unit 212 may be a global positioning system that provides global positioning system data to terrain display process 206 within navigation unit 200. Alternatively, location information unit 212 may be an inertial guidance system on the aircraft. Of course, other types of location information units may be implemented depending on the particular embodiment.

Weather database 214 is used to provide weather information that may be included by terrain display process 206 when displaying a terrain elevation view on multifunction display 204. Weather database 214 may be one or more databases or services that provide weather information. The weather information may include both current weather information as well as weather forecasts. This information may describe weather conditions, such as cloud base or coverage, and wind speed and direction.

Although terrain display process 206 is implemented in a navigation unit with different displays, the different processes used in the advantageous embodiments may be implemented in other components. In other embodiments, these processes may be implemented in a computer or other data processing system in an electronic flight bag (EFB), which is a portable system that may be carried by a pilot or other flight crew from aircraft to aircraft.

Figure 3:
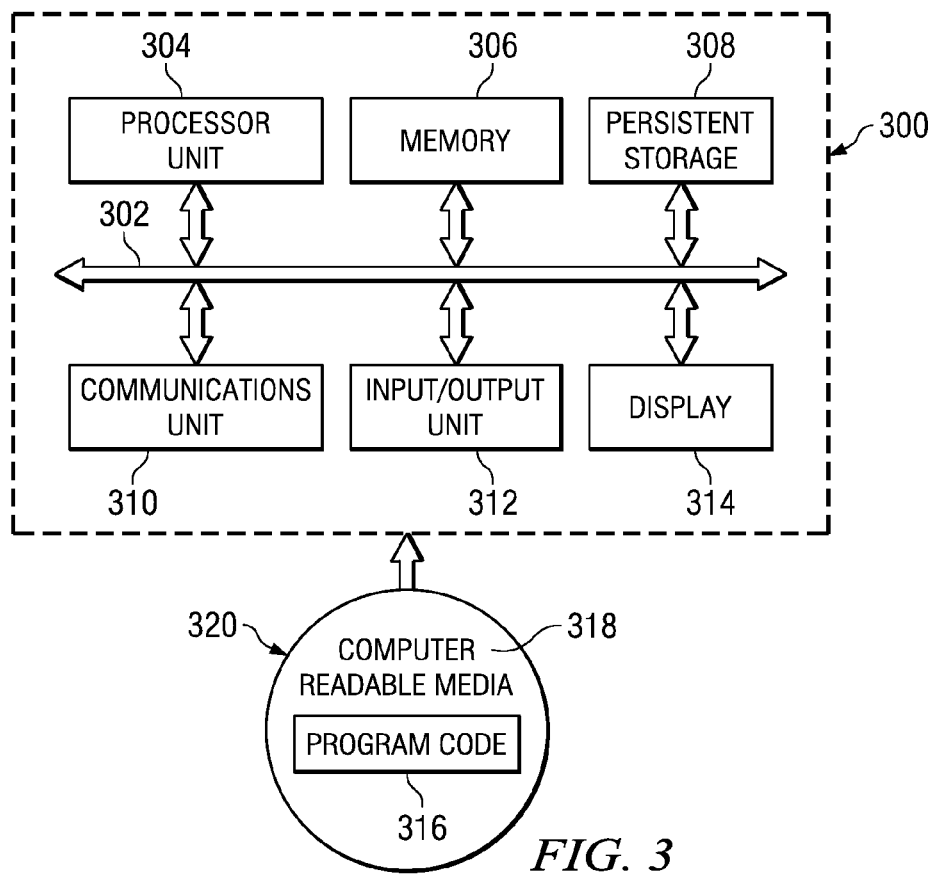
FIG. 3 is a diagram of a data processing system in accordance with an illustrative embodiment.

With reference now to FIG. 3, a diagram of a data processing system is depicted in accordance with an illustrative embodiment. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a number of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, a random access memory or any other suitable volatile or non-volatile storage device. Persistent storage 308 may take various forms depending on the particular implementation. For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

Input/output unit 312 allows for input and output of data with other devices that may be connected to data processing system 300. For example, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples.

In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

As one example, a storage device in data processing system 300 is any hardware apparatus that may store data. Memory 306, persistent storage 308, and computer readable media 318 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306 or a cache such as found in an interface and memory controller hub that may be present in communications fabric 302.

Figure 4:
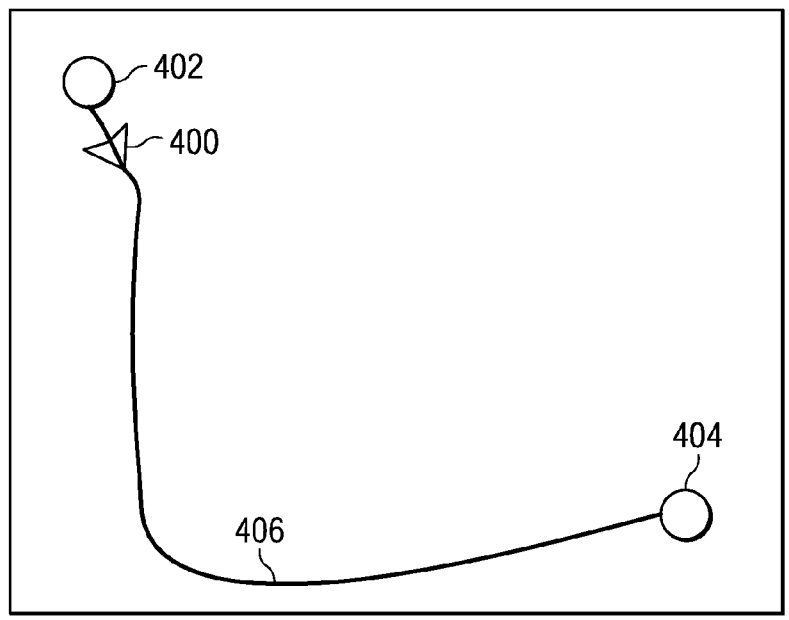
FIG. 4 is a diagram illustrating a route of an aircraft in accordance with an advantageous embodiment.

With reference now to FIG. 4, a diagram illustrating a route of an aircraft is depicted in accordance with an advantageous embodiment. In this example, aircraft 400 may take off from origination point 402 and fly to destination point 404 along route 406. Route 406 is a planned route in these examples. Origination point 402 may be a point of departure from an airport. Alternatively, origination point 402 may be some other point selected by the pilot or aircraft crew during flight. In a similar fashion, destination point 404 may be a point of arrival at another airport or some other point along the route selected by a pilot or aircraft crew.

In this example, route 406 is not a straight line between origination point 402 and destination point 404. The display of terrain provided in these examples may be for terrain along route 406. An example of a display that may be presented through multifunction display 204 in FIG. 2 is illustrated in FIG. 5.

In some advantageous embodiments, aircraft 400 may not use a planned route. With this type of implementation, route 406 may be generated based on the current heading of aircraft 400. Route 406 may then be a straight line that extends from aircraft 400 in the current direction of aircraft 400. With this implementation, route 406 may only extend for some selected distance from aircraft 400. Thus, route 406 would change in direction as aircraft 400 changes in direction.

Figure 5:
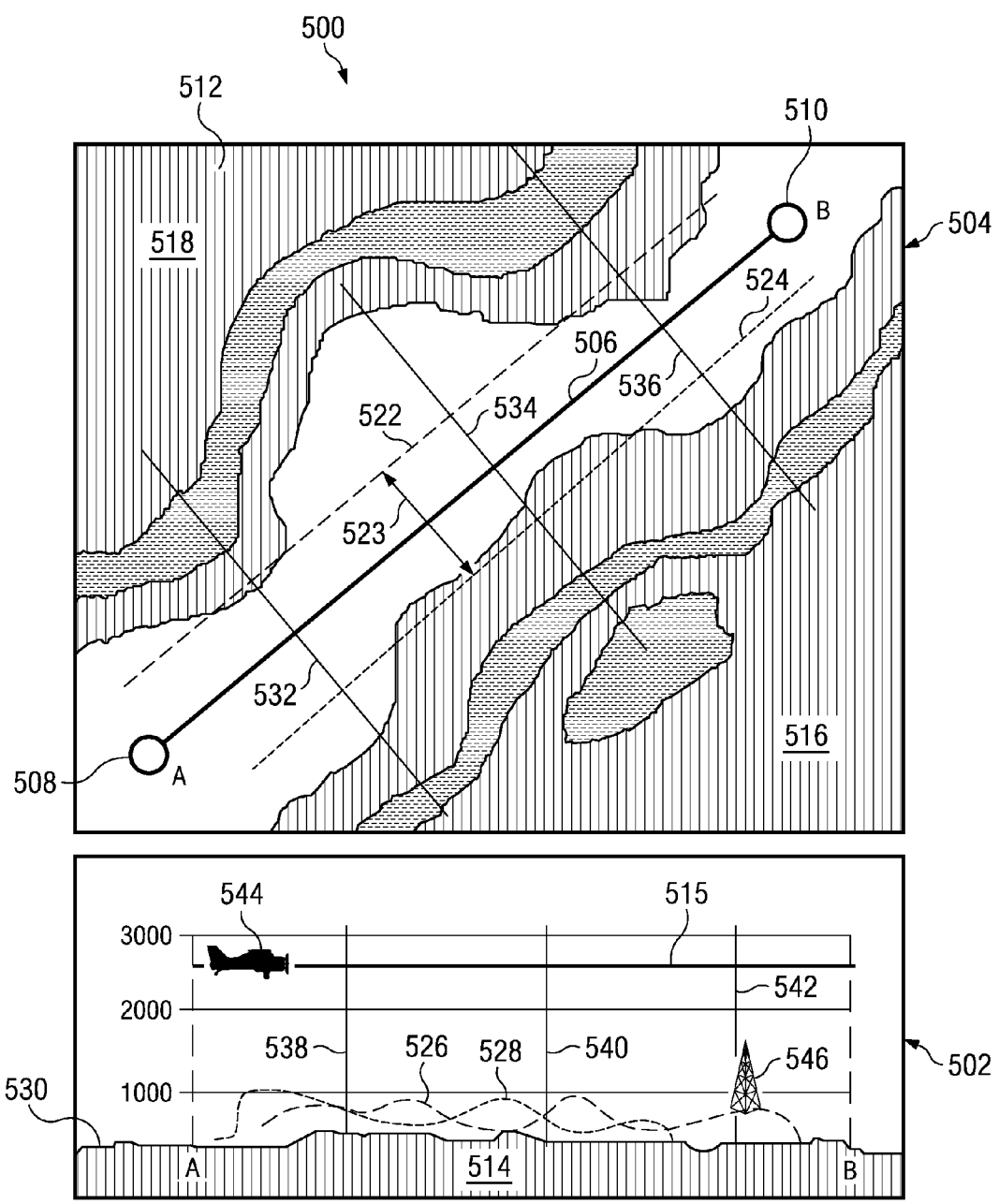
FIG. 5 is a diagram of a terrain display in accordance with an advantageous embodiment.

With reference now to FIG. 5, a diagram of a terrain display is depicted in accordance with an advantageous embodiment. In this example, display 500 is an example of a display presented in multifunction display 204 in FIG. 2. In particular, this display may be generated using terrain display process 206 in FIG. 2. As depicted, display 500 includes a number of different views. These views include vertical profile side view 502 and top view 504. In these examples, vertical profile side view 502 and top view 504 each individually or in combination may form a two dimensional view with three dimensional information for the route along which an aircraft flies.

In this example, segment 506 is a portion of a route between point 508 and point 510. Segment 506 may be a portion of a route, such as route 406 in FIG. 4. In other advantageous embodiments, segment 506 represents all of route 406 in FIG. 4.

In this example, terrain 512 is displayed within top view 504. Top view 504 provides a contour map over which segment 506 is overlaid or displayed to allow an operator to see terrain 512 around the route of the aircraft.

Vertical profile side view 502 provides a view of terrain 512 in section 514. In these examples, section 514 may illustrate terrain 512 directly below segment 515. Segment 515 corresponds to segment 506 in top view 504. Additionally, section 514 may be displayed in a manner to show terrain close by on one side or the other side of segment 515. For example, section 514 may be a display of the highest level of terrain that may be on either side of segment 515, such as the terrain in sections 516 and 518 in top view 504.

Additionally, top view 504 displays corridor width 523 corresponding to segment 506 for the route between point 508 and point 510 using line 522 and line 524. Corridor width 523, for example, may be one mile to either side of an aircraft, five miles to either side of an aircraft, one thousand feet to either side of an aircraft, or some other selected distance from an aircraft on either side of an aircraft along a planned flight route. These preset distances for corridor width 523 may be selected for the entire length of the route or for some portion of the route depending on the particular implementation.

Line 522 marks the portion of width corridor 523 to the left of an aircraft, while line 524 marks the portion of width corridor 523 to the right of an aircraft. Line 522 and line 524 are examples of one type of graphical indicators that are distinguished by different graphical features that may be used in presenting these lines. For example, in an illustrative embodiment, if the graphical feature is color, one graphical indicator, such as line 522, will be one color while the other graphical indicator, such as line 524, will be a different color than line 522. In another illustrative embodiment, if the graphical indicator is a line and the graphical feature is a type of line pattern, line 522 may be a broken line while line 524 is a dotted line.

These illustrations are not meant to imply architectural limitations but are merely used for illustrative purposes to describe the visual difference the advantageous embodiments recognize for distinguishing between the portion of width corridor 523 to the left of an aircraft and the portion of width corridor 523 to the right of an aircraft.

In other embodiments, vertical profile side view 502 may provide additional graphical indicators and graphical features to correlate terrain information for added intuitive identification. In these examples, vertical profile side view 502 displays terrain 514 using lines 526, 528, and 530. These contour lines identify the terrain along different portions of segment 515.

Line 526 identifies the terrain to the left of an aircraft. Line 528 identifies the terrain to the right of an aircraft. Line 530 identifies the terrain directly underneath the aircraft. Lines 526, 528, and 530 are examples of graphical indicators representing contour lines. Lines 526, 527, and 530 are also displayed with graphical features to correlate the terrain being displayed with top view 504. In an illustrative embodiment, if the graphical feature used is color, and line 526 in vertical profile side view 502 is red, line 522 in top view 504 is also red. Likewise, in this illustrative embodiment, if line 528 in vertical profile side view 502 is green, line 524 in top view 504 is also green. Green is used for the line identifying terrain to the right side of the aircraft and red is used for the line identifying terrain to the left side of the aircraft to provide intuitive colors recognized by pilots since the navigation lights on an aircraft are green on the right wing and red on the left wing.

Furthermore, in this same illustrative embodiment, line 530 may be a third color to indicate the terrain elevation directly below the aircraft. In these examples, an operator can view the two dimensional vertical profile side view 502 of display 500 and receive three dimensional information about the terrain elevation to the left and right of an aircraft, as well as directly under an aircraft, as indicated by the graphical feature used for lines 526, 528, and 530. This type of presentation of graphical indictors allows an operator to quickly assess at a glance terrain implications to either side of an aircraft in the event that a flight plan requires a change in route, or an aircraft drifts off-course during a route.

In these examples, a number of graphical indicators in the form of lines 532, 534, and 536 are displayed in top view 504. A number of graphical indicators in the form of lines 538, 540, and 542 are displayed in vertical profile side view 502. Further, these graphical indicators are presented in a manner that allows for a correlation of terrain data between the different views. For example, the location of lines 532, 534, 536, 538, 540, and 542 and their position with respect to the displayed terrain may allow an operator to correlate vertical profile side view 502 with top view 504.

In yet other embodiments, images or graphical symbols may be presented as graphical indicators or other information in the different views. For example, vertical profile side view 502 also may include images or graphical symbols to represent vertical obstructions, such as radio tower 546. These vertical obstructions may include, for example, radio towers, antennae, buildings, and other obstructions. By presenting these types of obstructions, a clearer cross-track clearance relative to the aircraft may be identified. Also, other information, such as special use or terminal airplane space identifications, may be overlaid or presented within vertical profile side view 502.

In other embodiments, a symbol representing the aircraft may or may not be displayed in all of the views. For example, a symbol is not shown in top view 504, but may be included in other advantageous embodiments. For example, symbol 544 in vertical profile side view 502 may be used to identify the location of an aircraft with respect to segment 506. Segment 515 in vertical profile side view 502 provides a similar view of a route. The example of the manner in which terrain is displayed in display 500 is not meant imply limitations as to how a vertical profile side view may be presented along with a two dimensional view of terrain. For example, other arrangements of vertical profile side view 502 and top view 504 may be presented. For example, vertical profile side view 502 may be presented in a different size or in a different location than display 500.

Further, other types of graphical indicators and features other than lines and color coding may be used. For example, other graphical features may include, without limitation, different types of lines, such as dotted lines, dash lines, dots and dashes in lines, and other suitable types of lines used to present the number of graphical indicators to correlate the terrain information. Also, instead of color coding, graphical symbols may be displayed in association with the lines or in place of the lines depending on the particular implementation. In other embodiments, another type of graphical indicator may be filled sections, while the graphical features used to distinguish the filled sections may be shading, pattern, color, and the like.

Figure 6:
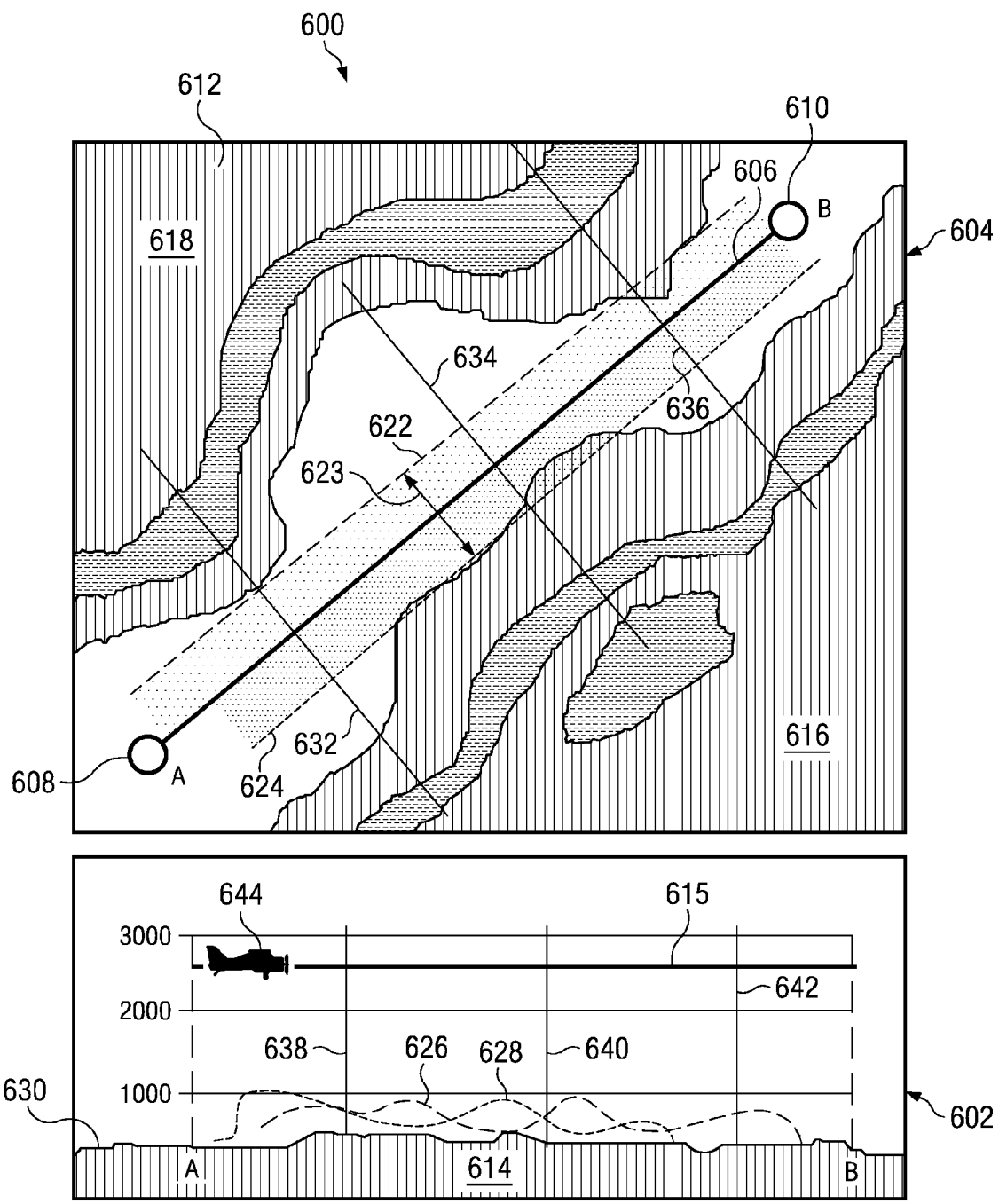
FIG. 6 is another diagram of a terrain display in accordance with an advantageous embodiment.

With reference now to FIG. 6, another diagram of a terrain display is depicted in accordance with an advantageous embodiment. In this example, display 600 is an example of a display presented in multifunction display 204 in FIG. 2. In particular, this display may be generated using terrain display process 206 in FIG. 2. Display 600 is similar to display 500, but illustrates different graphical indicators in top view 604 used to represent positional terrain data.

As depicted, display 600 includes a number of different views. These views include vertical profile side view 602 and top view 604. In these examples, vertical profile side view 602 and top view 604 each individually or in combination may form a two dimensional view with three dimensional information for the route along which an aircraft flies.

In this example, segment 606 is a portion of a route between point 608 and point 610. Segment 606 may be a portion of a route, such as route 406 in FIG. 4. In other advantageous embodiments, segment 606 represents all of route 406 in FIG. 4.

In this depicted example, terrain 612 is displayed within top view 604. Top view 604 provides a contour map over which segment 606 is overlaid or displayed to allow an operator to see terrain 612 around the route of the aircraft.

Vertical profile side view 602 provides a view of terrain 612 in section 614. In these examples, section 614 may illustrate terrain 612 directly below segment 615. Segment 615 corresponds to segment 606 in top view 604.

Additionally, top view 604 displays corridor width 623 corresponding to segment 606 for the route between point 608 and point 610 using shaded section 622 and shaded section 624. As previously discussed, corridor width 623, for example, may be some selected distance from an aircraft on either side of an aircraft along a planned flight route.

Shaded section 622 marks the portion of corridor width 623 to the left of an aircraft, while shaded section 624 marks the portion of corridor width 623 to the right of an aircraft. Shaded section 622 and shaded section 624 are examples of a type of graphical indicator distinguished by different graphical features. For example, in this illustrative embodiment, the graphical feature is shading or pattern. Shaded section 622 will be shaded with a certain degree of denseness, or gradation, while shaded section 624 will be shaded with a different degree of denseness, or gradation, than shaded section 622.

In another advantageous embodiment, if the graphical feature for a graphical indicator is a pattern of shading, shaded section 622 may be shaded with hash marks while shaded section 624 is a solid shaded section. These illustrations are not meant to imply architectural limitations but are merely used for illustrative purposes to describe the visual difference the advantageous embodiments recognize for distinguishing between the portion of corridor width 623 to the left of an aircraft and the portion of corridor width 623 to the right of an aircraft.

Vertical profile side view 602 provides additional terrain information. In these examples, vertical profile side view 602 displays terrain 614 using lines 626, 628, and 630. These contour lines identify the terrain along different portions of segment 615.

Line 626 identifies the terrain to the left of an aircraft. Line 628 identifies the terrain to the right of an aircraft. Line 630 identifies the terrain directly underneath the aircraft. Lines 626, 628, and 630 are graphical indicators that represent terrain contour lines, and are also displayed with graphical features to correlate the terrain being displayed with top view 604. In an illustrative embodiment, if one of the graphical features used is color, and line 626 in vertical profile side view 602 is red, shaded section 622 in top view 604 is also shaded red. Likewise, in this illustrative embodiment, if line 628 in vertical profile side view 602 is green, shaded section 624 in top view 604 is also shaded green.

Furthermore, in this same illustrative embodiment, line 630 may be a third color to indicate the terrain elevation directly below the aircraft. In these examples, an operator can view the two dimensional vertical profile side view 602 of display 600 and receive three dimensional information about the terrain elevation to the left and right of an aircraft, as well as directly under an aircraft, as indicated by the graphical feature used for lines 626, 628, and 630. This allows an operator to quickly assess at a glance terrain implications to either side of an aircraft in the event that a flight plan requires a change in route, or an aircraft drifts off-course during a route.

In these examples, a number of graphical indicators in the form of lines 632, 634, and 636 are displayed in top view 604. A number of graphical indicators in the form of lines 638, 640, and 642 are displayed in vertical profile side view 602. Further, these graphical indicators are presented in a manner that allows for a correlation of terrain data between the different views. For example, the location of lines 632, 634, 636, 638, 640, and 642 and their position with respect to the displayed terrain may allow an operator to correlate vertical profile side view 602 with top view 604.

Figure 7:
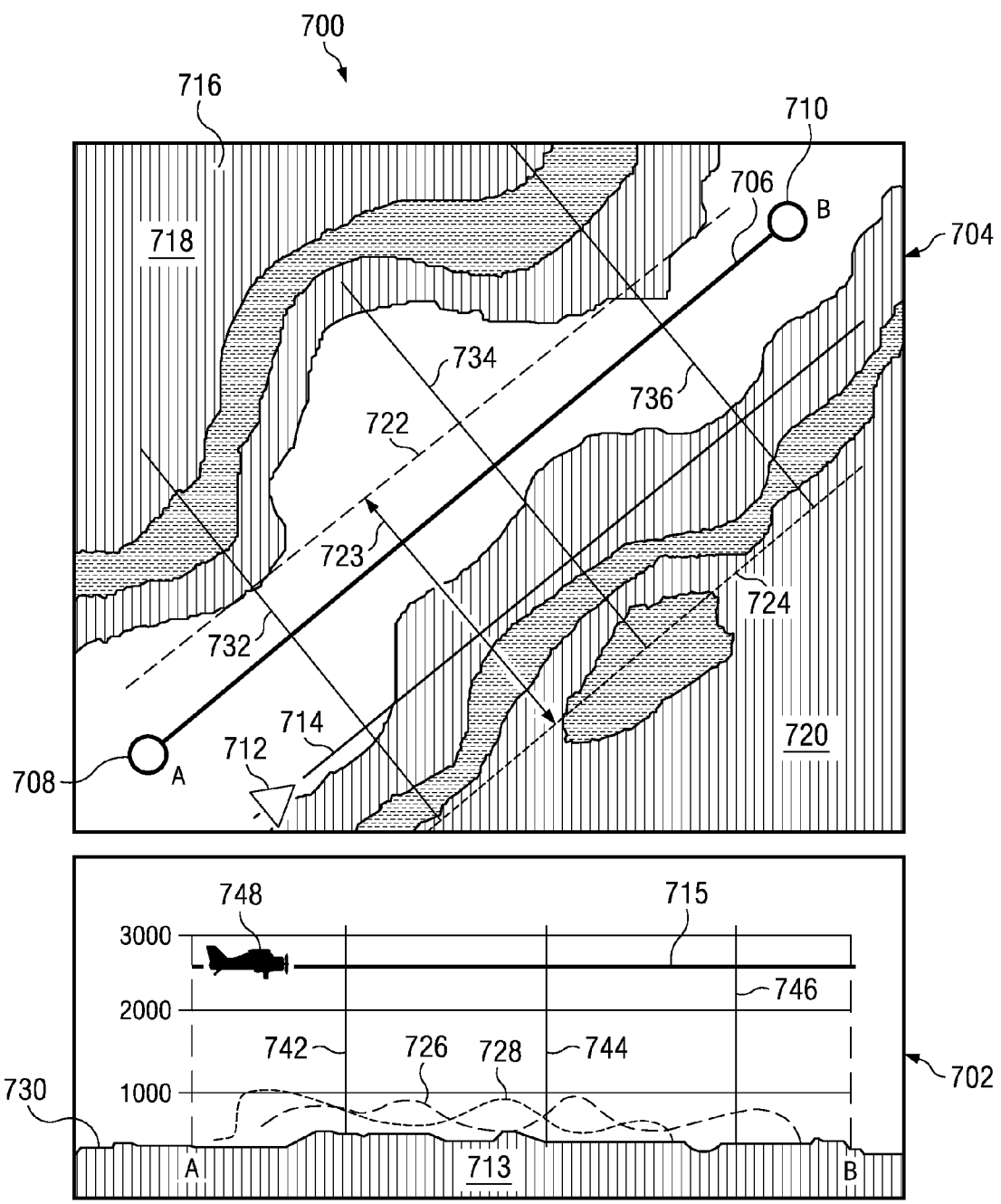
FIG. 7 is yet another diagram of a terrain display in accordance with an advantageous embodiment.

With reference now to FIG. 7, yet another diagram of a terrain display is depicted in accordance with an advantageous embodiment. In this example, display 700 is an example of a display presented in multifunction display 204 in FIG. 2. In particular, this display may be generated using terrain display process 206 in FIG. 2. Display 700 is similar to display 500 and display 600, but illustrates an expanded corridor width to compensate for an off-course flight route.

As depicted, display 700 includes a number of different views. These views include vertical profile side view 702 and top view 704. These views are similar to the views depicted in FIG. 5 and FIG. 6.

In this example, segment 706 is a portion of a planned flight route between point 708 and point 710. Segment 706 may be a portion of a planned flight route, such as route 406 in FIG. 4. In other advantageous embodiments, segment 706 represents all of route 406 in FIG. 4.

In this example, symbol 712 in top view 704 may be used to identify the location of an aircraft with respect to segment 706. The aircraft may be off-course from the planned flight route between point 708 and point 710, traveling along segment 714, which is a projected flight route based on the current location and travel direction of the aircraft depicted by symbol 712.

In this example, terrain 716 is displayed within top view 704. Top view 704 provides a contour map over which segment 706 is overlaid or displayed to allow an operator to see terrain 716 around the route of the aircraft.

Vertical profile side view 702 provides a view of terrain 716 in section 713. In these examples, section 713 may illustrate terrain directly below segment 715. In this illustrative embodiment, segment 715 corresponds to segment 714 in top view 704.

Additionally, section 713 may be displayed in a manner to show terrain close by on one side or the other side of segment 715. For example, section 713 may be a display of the highest level of terrain that may be on either side of segment 715, such as the terrain in sections 718 and 720 in top view 704.

Additionally, top view 704 displays corridor width 723 corresponding to segment 706 for the planned flight route between point 708 and point 710 using line 722 and line 724. Line 722 marks the portion of corridor width 723 to the left of an aircraft, while line 724 marks the portion of corridor width 723 to the right of an aircraft. In an illustrative embodiment, the aircraft depicted by symbol 712 is off-course and traveling along segment 714, a projected flight route to the right of the planned flight route.

In an illustrative embodiment, when an aircraft drifts off-course and travels along segment 714, corridor width 723 expands to compensate for the additional terrain data needed to the side of the aircraft to which the aircraft is off-course. For example, if the normal corridor width has been preset at one mile to either side of an aircraft, and the aircraft traveling along segment 714 is to the right of the planned flight route between point 708 and point 710, corridor width 723 expands an additional one mile to the right of segment 714 to provide terrain data to at least the preset distance to either side of the aircraft. Corridor width 723 may then span the distance one mile to the right of an aircraft, and more than one mile to the left of the aircraft traveling along segment 714, depending upon how far off-course segment 714 is from the planned flight route between point 708 and point 710.

In this advantageous embodiment, the corridor width to the right side of the aircraft is expanded, as depicted by line 724, to encompass terrain information relative to the actual position of the aircraft on the terrain. This provides accurate information to the operator about the terrain that is currently below the aircraft traveling along segment 714, as well as the terrain around the aircraft traveling along segment 714 and the terrain around the planned flight route along segment 706. In this illustrative embodiment, when an aircraft drifts off-course, or changes course from a planned flight route, dynamic terrain information is still available to an operator.

Line 722 and line 724 are graphical indicators distinguished by different graphical features. For example, in an illustrative embodiment, if the graphical feature is color, line 722 will be one color while line 724 will be a different color than line 722. In another illustrative embodiment, if the graphical feature is a type of line pattern, line 722 may be a broken line while line 724 is a dotted line. These illustrations are not meant to imply architectural limitations but are merely used for illustrative purposes to describe the visual difference the advantageous embodiments recognize for distinguishing between the portion of corridor width 723 to the left of an aircraft and the portion of corridor width 723 to the right of an aircraft.

Vertical profile side view 702 provides additional terrain information. In these examples, vertical profile side view 702 displays terrain 713 using lines 726, 728, and 730. These contour lines identify the terrain along different portions of segment 715, which corresponds to segment 714 in top view 704. Line 726 identifies the terrain to the left of an aircraft. Line 728 identifies the terrain to the right of an aircraft. Line 730 identifies the terrain directly underneath the aircraft. These contour lines are also displayed with graphical features to correlate the terrain being displayed with top view 704.

In these examples, an operator can view the two dimensional vertical profile side view 702 of display 700 and receive three dimensional information about the terrain elevation to the left and right of an aircraft, as well as directly under an aircraft, which allows an operator to quickly assess at a glance terrain implications to either side of an aircraft in the event that a flight plan requires a change in route, or an aircraft drifts off-course during a route.

In these examples, a number of graphical indicators in the form of lines 732, 734, and 736 are displayed in top view 704. A number of graphical indicators in the form of lines 742, 744, and 746 are displayed in vertical profile side view 702. Further, these graphical indicators are presented in a manner that allows for a correlation of terrain data between the different views.

Figure 8:
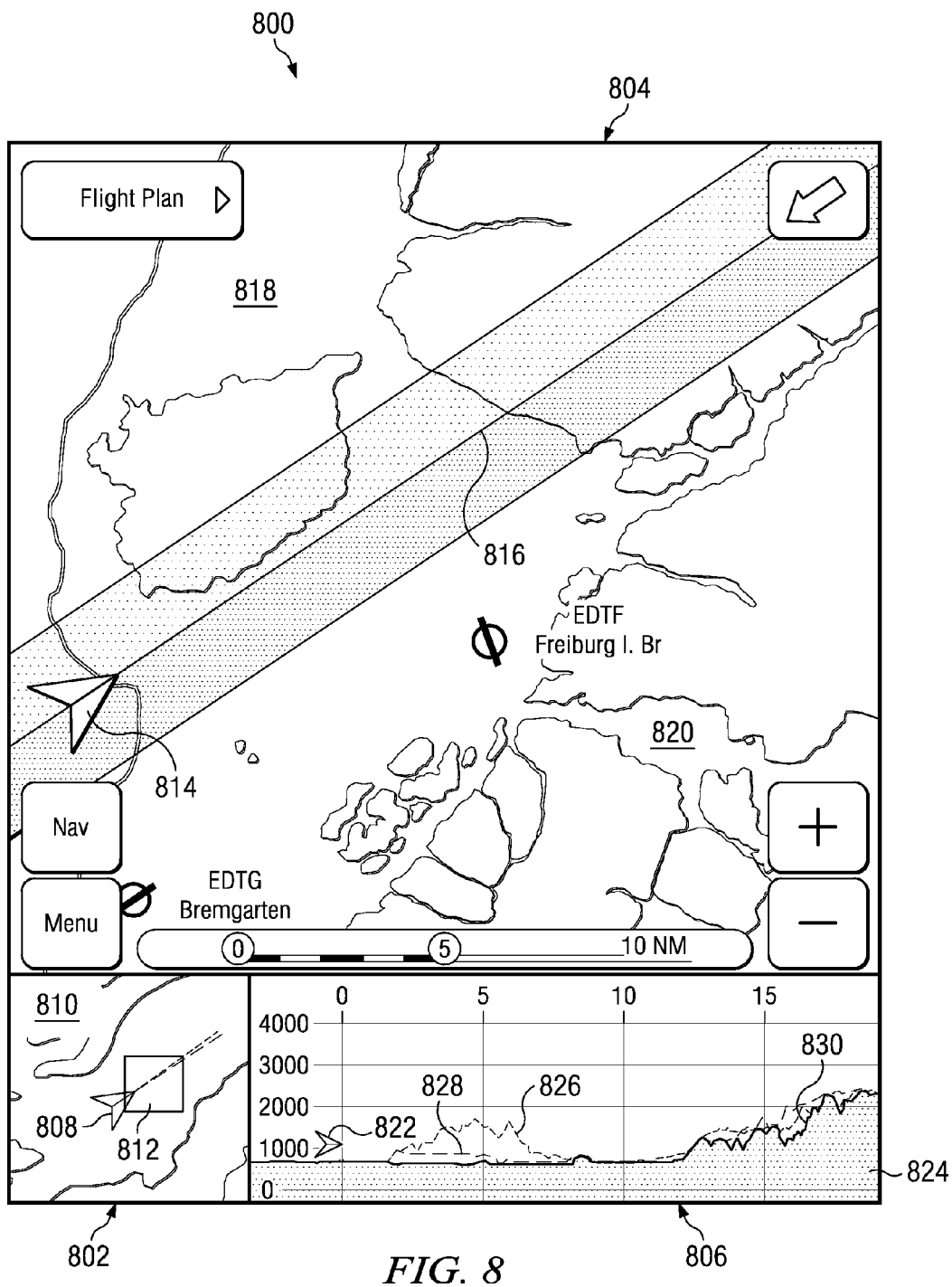
FIG. 8 is yet another diagram of a terrain display in accordance with an advantageous embodiment.

With reference now to FIG. 8, yet another diagram of a terrain display is depicted in accordance with an advantageous embodiment. In this example, display 800 is an example of a display presented in multifunction display 204 in FIG. 2. In particular, this display may be generated using terrain display process 206 in FIG. 2. Display 800 depicts a projected flight route for an aircraft without a planned flight route.

As depicted, display 800 includes a number of different views. These views include top view 802, enhanced top view 804, and vertical profile side view 806. Enhanced top view 804 is an example of top view 504 in FIG. 5. Vertical profile side view 806 is an example of vertical profile side view 502 in FIG. 5.

In this example, symbol 808 in top view 802 may be used to identify the location of an aircraft with respect to terrain 810. Box 812 indicates the portion of the flight route that is enhanced for viewing in enhanced top view 804. Symbol 814 in enhanced top view 804 may be used to identify the location of an aircraft with respect to projected flight route 816. Symbol 814 correlates with symbol 808 in top view 802. Projected flight route 816 may be a portion of a route, such as route 406 in FIG. 4. In other advantageous embodiments, projected flight route 816 represents all of route 406 in FIG. 4. The aircraft may be on a changed flight route from a planned flight route, or off-course from a planned flight route.

In this example, the terrain in sections 818 and 820 is displayed within enhanced top view 804. Enhanced top view 804 provides a contour map over which projected flight route 816 is overlaid or displayed to allow an operator to see the terrain in sections 818 and 820 around the route of the aircraft.

Vertical profile side view 806 provides a view of the terrain in sections 818 and 820 in section 824. In these examples, section 824 may illustrate terrain directly below projected flight route 816. Section 824 may also illustrate terrain around projected flight route 816.

Additionally, section 824 may be displayed in a manner to show terrain close by on one side or the other side of projected flight route 816. For example, section 824 may be a display of the highest level of terrain that may be on either side of projected flight route 816, such as the terrain in sections 818 and 820 in enhanced top view 804.

Further, symbol 822 in vertical profile side view 806 may be used to identify the location of an aircraft with respect to section 824. Symbol 822 in vertical profile side view 806 correlates with symbol 814 in enhanced top view 804.

Vertical profile side view 806 provides additional terrain information. In these examples, vertical profile side view 806 displays the terrain in section 824 using lines 826, 828, and 830. These contour lines identify the terrain along different portions of projected flight route 816 in enhanced top view 804. In an illustrative embodiment, line 826 identifies the terrain to the left of an aircraft, line 828 identifies the terrain to the right of an aircraft, and line 830 identifies the terrain directly underneath the aircraft. These contour lines may be displayed with graphical features to correlate the terrain being displayed with enhanced top view 804. For example, the terrain in section 818 to the left of projected flight route 816 in enhanced top view 804 may be shaded in one color, while the terrain in section 820 to the right of projected flight route 816 may be shaded another color. Line 826 may appear in the same color as the shaded portion of the terrain in section 818 to the left of projected flight route 816 and represents the maximum terrain height within the shaded area. Likewise, line 828 may appear in the same color as the shaded portion of the terrain in section 820 to the right of projected flight route 816 and represents the maximum terrain height within the shaded area. Line 830 may be displayed using a third color to indicate the terrain directly below projected flight route 816, and further, the shaded portion depicting projected flight route 816 may be displayed using the same color as line 830. In these examples, an operator can view the two dimensional vertical profile side view 806 of display 800 and receive three dimensional information about the terrain elevation to the left and right of an aircraft, as well as directly under an aircraft, which allows an operator to quickly assess at a glance terrain implications to either side of an aircraft along a flight route.

Figure 9:
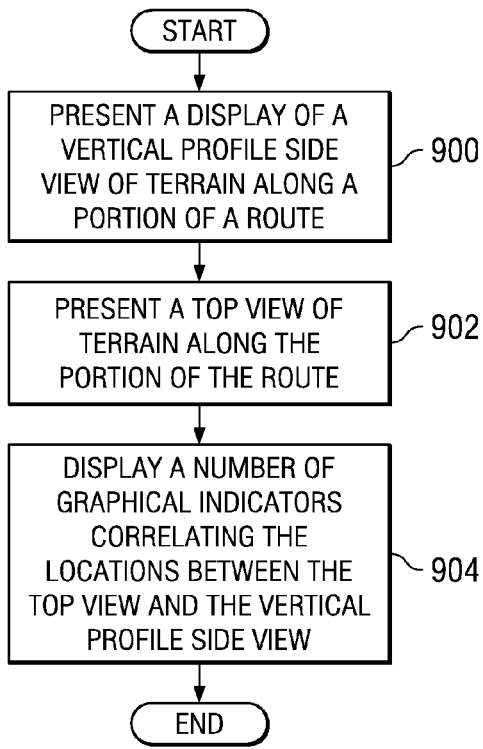
FIG. 9 is a flowchart of a process for displaying terrain information in accordance with an advantageous embodiment.

With reference now to FIG. 9, a flowchart of a process for displaying terrain information is depicted in accordance with an advantageous embodiment. The process illustrated in FIG. 9 may be implemented in a software component, such as terrain display process 206 in FIG. 2.

The process begins by presenting a display of a vertical profile side view of terrain along a portion of a route (operation 900). The route may be a planned flight route, or a projected flight route generated based on the current direction of travel of an aircraft. The view presented in operation 900 may be similar to vertical profile side view 502 in FIG. 5. This view may include a display of terrain along with contour lines, or just a number of contour lines in these examples. These contour lines also may form the graphical indicators in this view. The process presents a top view of terrain along the portion of the route (operation 902). Operation 902 may be implemented by presenting views, such as top view 504 and/or vertical profile side view 502 in FIG. 5.

The process then displays a number of graphical indicators correlating the locations between the top view and the vertical profile side view (operation 904), with the process terminating thereafter.

In these examples, a number of graphical indicators may be a number of lines, such as the contour lines illustrated in vertical profile side view 502 and the lines illustrated in top view 504. These lines are displayed at locations with respect to the route and they correlate to each other through the use of various graphical features, such as color, line type, and other suitable graphical indication mechanisms.

Figure 10:
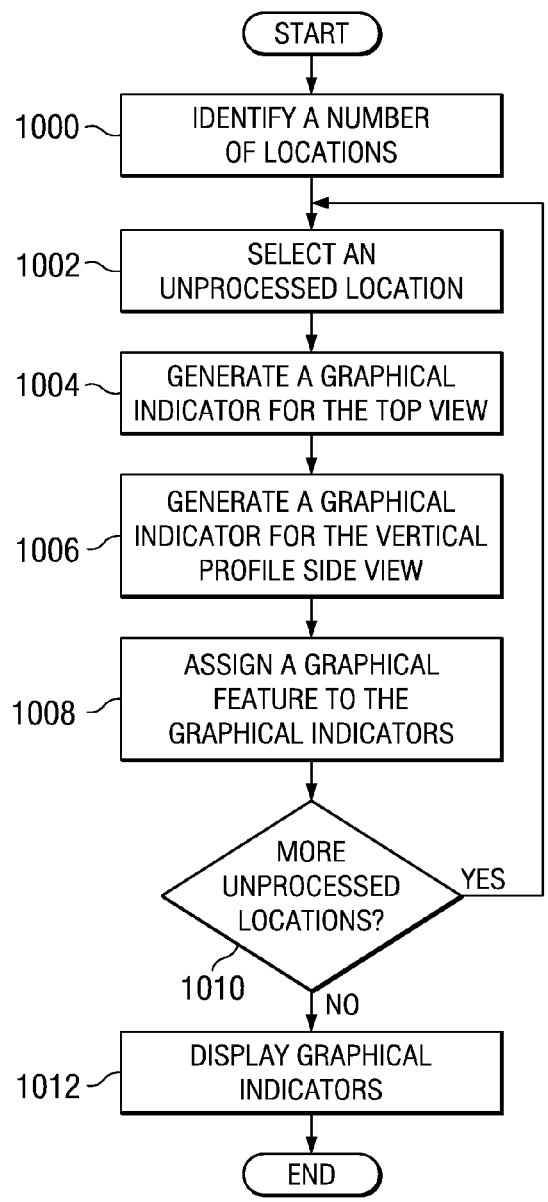
FIG. 10 is a flowchart of a process for presenting graphical indicators in accordance with an advantageous embodiment.

With reference now to FIG. 10, a flowchart of a process for presenting graphical indicators is depicted in accordance with an advantageous embodiment. The process illustrated in FIG. 10 may be implemented in a software component, such as terrain display process 206 in FIG. 2.

The process begins by identifying a number of locations for graphical indicators (operation 1000). These locations may be identified in a number of different ways. For example, a preset distance may be used for each location along a planned flight route. As an example, a location may be selected for a graphical indicator one mile to either side of an aircraft, five miles to either side of an aircraft, one thousand feet to either side of an aircraft, or some other selected distance from an aircraft on either side of an aircraft along a planned flight route. These locations may be selected for the entire length of the route or for some portion of the route depending on the particular implementation. These locations may also be referred to as a width corridor of an aircraft flight route.

The process selects an unprocessed location (operation 1002). A graphical indicator is generated for the top view at the selected location (operation 1004). In these examples, the graphical indicator may be a line, such as line 522 for top view 504 in FIG. 5, which provides a visual display of terrain contour or obstructions in the terrain. The process then generates a graphical indicator for the vertical profile side view (operation 1006). The process assigns a graphical features to the graphical indicators (step 1008) of both the top and vertical profile side view. This graphical feature may be, for example, a color or a pattern. The graphical indicator for the top view may have the same correlating graphical feature as the graphical indicator for the vertical profile side view, such as, for example, a same color. For example, line 526 in vertical profile side view 502 correlates with line 522 in top view 504 in FIG. 5. The correlating graphical feature for lines 522 and 526 may be, for example, the color red. The same color allows correlation between these different locations in the different views.

The process determines whether more unprocessed locations are present (operation 1010). If additional unprocessed locations are present, the process returns to operation 1002 to select another unprocessed location. Otherwise, the process displays the graphical indicators on the different views (operation 1012), with the process terminating thereafter.

Figure 11:
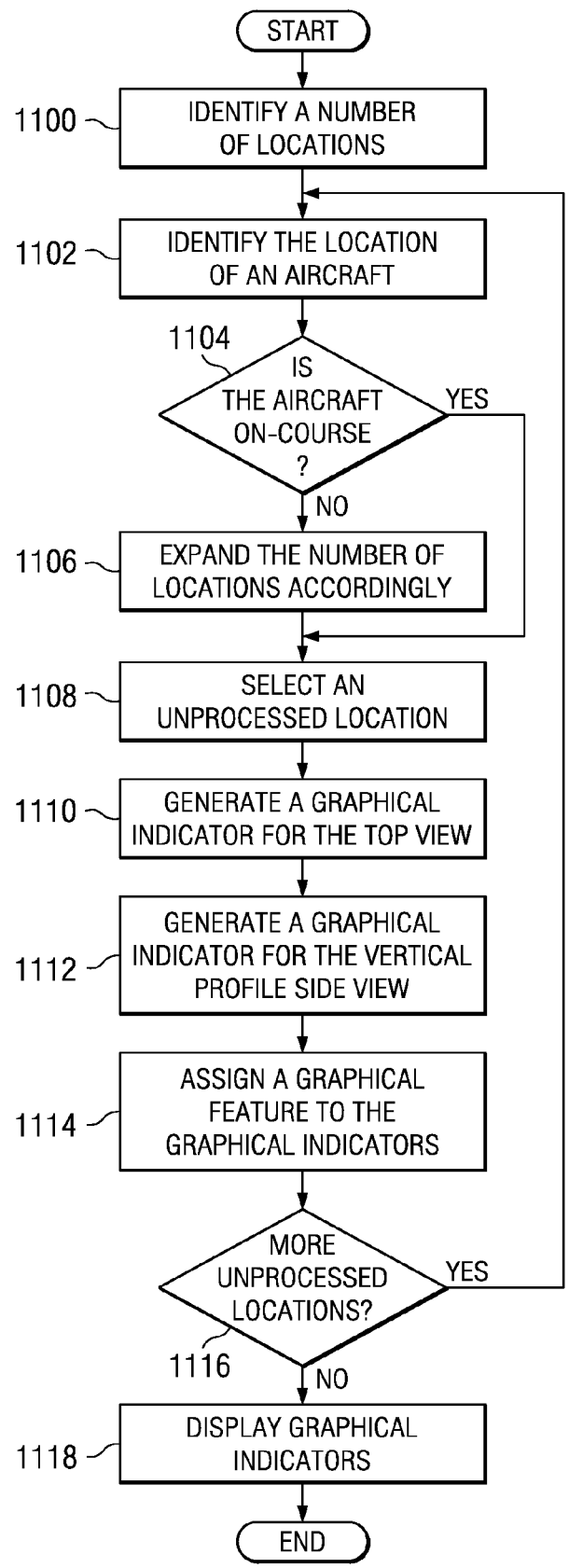
FIG. 11 is another flowchart of a process for presenting graphical indicators in accordance with an advantageous embodiment.

With reference now to FIG. 11, another flowchart of a process for presenting graphical indicators is depicted in accordance with an advantageous embodiment. The process illustrated in FIG. 11 may be implemented in a software component, such as terrain display process 206 in FIG. 2. This process compensates for deviations from a planned flight route by expanding the number of locations identified when generating graphical indicators.

The process begins by identifying a number of locations for graphical indicators (operation 1100). These locations may be identified in a number of different ways. For example, a preset distance may be used for each location along a planned flight route. As an example, a location may be selected for a graphical indicator one mile to either side of an aircraft, five miles to either side of an aircraft, one thousand feet to either side of an aircraft, or some other selected distance from an aircraft on either side of an aircraft along a planned flight route. These locations may be selected for the entire length of the route or for some portion of the route depending on the particular implementation. These locations may also be referred to as a width corridor of an aircraft flight route.

The process then identifies the location of an aircraft (operation 1102) with respect to the planned flight route. The process determines whether the aircraft is on-course (operation 1104) with respect to the planned flight route, or has drifted off-course of made a change to the flight route. If the aircraft is not on-course, the process expands the number of locations accordingly (operation 1106). In this example, the expansion of the number of locations may be based on expanding the width of the corridor on either side of an aircraft. For example, if a preset distance, such as one thousand feet on either side of an aircraft, was used for each location along a planned flight route, the distance is expanded on the side of the aircraft to which the aircraft is off-course from the planned flight route. If the aircraft has drifted off-course and is currently traveling to the right of the planned flight route, the preset distance is expanded to reflect the distance to the right of the current route of an aircraft, which is beyond the preset distance to the right of the planned flight route. These locations may also be referred to as a corridor width, such as corridor width 523 in FIG. 5, of an aircraft flight route. In an illustrative embodiment, expanding the preset distance may also be referred to as expanding the corridor width of an aircraft flight route. Once operation 1106 has been implemented, the process proceeds to operation 1108.

If the aircraft is on-course, the process selects an unprocessed location (operation 1108). Next, the process generates a graphical indicator for the top view at the selected location (operation 1110). In these examples, the graphical indicator may be a line, such as line 522 for top view 504 in FIG. 5, which provides a visual display of terrain contour or obstructions in the terrain. The process then generates a graphical indicator for the vertical profile side view (operation 1112). The process assigns a graphical features to the graphical indicators (step 1114) of both the top and vertical profile side view. This graphical feature may be, for example, a color or a pattern. The graphical indicator for the top view may have the same correlating graphical feature as the graphical indicator for the vertical profile side view, such as, for example, a same color. For example, line 526 in vertical profile side view 502 correlates with line 522 in top view 504 in FIG. 5. The correlating graphical feature for lines 522 and 526 may be, for example, the color red. The same color allows correlation between these different locations in the different views.

The process determines whether more unprocessed locations are present (operation 1116). If additional unprocessed locations are present, the process returns to operation 1102 to select another unprocessed location. Otherwise, the process displays the graphical indicators on the different views (operation 1118), with the process terminating thereafter.

The flowcharts and block diagrams in the different depicted embodiments illustrate the architecture, functionality, and operation of some possible implementations of apparatus, methods, and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The illustrative embodiments provide a method, apparatus, and computer program product for presenting terrain along a route of an aircraft such that the position of terrain is displayed relative to the aircraft along the route. Pilots are provided three dimensional information about the terrain elevation to the left and right of an aircraft, as well as directly under an aircraft, in a two dimensional view, which allows pilots to quickly assess at a glance terrain implications to either side of an aircraft in the event that a flight plan requires a change in route, or an aircraft drifts off-course during a route.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Although the different advantageous embodiments in the illustrative examples are describe with respect to an aircraft, one or more the different advantageous embodiments may be applied to other vehicles other than aircraft, such as, for example, without limitation, a submarine, a spacecraft, a surface ship, and other suitable vehicles. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for presenting on a display, terrain along a route of a vehicle, the route comprises a path of the vehicle, wherein the path comprises a first segment independent of a current heading of the vehicle, the method comprising:
  processing terrain data in a processor unit receiving a present location, of the vehicle, from a location device;
  receiving in the processor unit, a selection of a distance for a width for each segment of the route;
  displaying, on the display, a vertical profile side view of terrain within the width along the route, such that in response to the present location of the vehicle being offset from a centerline of the first segment, laterally to one side of the centerline of the first segment, the processor expands the width, only on the one side of the first segment, from the present location, along a line of the offset, by one-half of the distance; and
  displaying a number of graphical indicators, on the display, of a position of the terrain, relative to a left side of and a right side of the vehicle, along the route.

2. The method for presenting on the display of claim 1, wherein at least one graphical indicator in the number of graphical indicators displayed in the vertical profile side view are terrain contour lines, wherein the terrain contour lines represent a highest terrain elevation within the width.

3. The method for presenting on the display of claim 1, wherein at least one graphical indicator in the number of graphical indicators displayed in the vertical profile side view is a symbol indicating a vertical obstruction.

4. The method for presenting on the display of claim 1, wherein the position of the terrain relative to the vehicle along the route comprises at least one of: a first position, wherein the first position is on a right side of the width, of the vehicle, a second position, wherein the second position is on a left side of the width, of the vehicle, and a third position that is directly under the vehicle within the width.

5. The method for presenting on the display of claim 4, wherein the first position is represented by a first graphical indicator in the number of graphical indicators displayed in the vertical profile side view, wherein the first graphical indicator is a first terrain contour line, and wherein the first terrain contour line represents a highest terrain elevation to the left side of the vehicle within the width.

6. The method for presenting on the display of claim 4, wherein the second position is represented by a second graphical indicator in the number of graphical indicators displayed in the vertical profile side view, wherein the second graphical indicator is a second terrain contour line, and wherein the second terrain contour line represents a highest terrain elevation to the right side of the vehicle within the width.

7. The method for presenting on the display of claim 4, wherein the third position is represented by a third graphical indicator in the number of graphical indicators displayed in the vertical profile side view, wherein the third graphical indicator is a third terrain contour line, and wherein the third terrain contour line represents a highest terrain elevation directly under the vehicle traveling within the width.

8. The method for presenting on the display of claim 1, wherein the vehicle is selected from one of an aircraft, a submarine, a spacecraft, and a surface ship.

9. A computer program product that comprises:
a computer non-transitory recordable storage medium configured to receive a present location of a vehicle from a location device;
a program code, stored on the non-transitory computer recordable medium, the program code configured to receive a selection for a distance of a width for each segment of a route of the vehicle, such that the computer presents graphical indicators on a vehicle display;
a vertical profile side view of terrain data, within the width, relative to a left side of and a right side of the vehicle, wherein the route comprises a path of the vehicle, wherein the path comprises a first segment that comprises a first width, and a second segment that comprises a second width, such that the first segment is independent of a heading of the vehicle, and such that in response to the present location of the vehicle being offset from the route, laterally to one side of a centerline of the first segment, the program code expands the first width, only on the one side of the centerline of the first segment, from the present location, along a line of the offset, by one-half of a distance selected for the first width, and in response to the present location of the vehicle being offset from the route, laterally to one side of a centerline of the second segment, the program code expands the second width, only on the one side to the centerline of the second segment, from the present location, along a line of the offset, by one-half of a distance selected for the second width; and
a number of the graphical indicators of a position of terrain on the vehicle display relative to the vehicle within the route.

10. The computer program product of claim 9, wherein at least one graphical indicator in the number of the graphical indicators displayed in the vertical profile side view are terrain contour lines, wherein the terrain contour lines represent a highest terrain elevation within the width.

11. The computer program product of claim 9, wherein the position relative to the vehicle along the route is one of a first position, wherein the first position is on the right side of the vehicle, within the width, a second position, wherein the second position is on a left side of the vehicle, within the width, and a third position that is directly under the vehicle within the width.

12. An apparatus that comprises:
a vehicle display; and
a storage device that comprises a stored display process; and
a processor unit connected to the vehicle display and storage device, the processor unit configured to receive, from a location device, a present location of a vehicle and a selection of a width for each segment of a route, such that in operation the processor unit executes the display process to display, on the vehicle display;
a vertical profile side view of terrain within the route of a vehicle on the display, wherein the route comprises a path of the vehicle, wherein the path comprises a first segment having a first width, and a second segment that comprises a second width, and wherein the first segment is independent of a heading of the vehicle, and such that in response to the present location of the vehicle being offset from the route, laterally to one side of a centerline of the first segment, the processor expands the first width, only on the one side of the centerline of the first segment, from the present location, along a line of the offset, by one-half of a distance selected for the first width, and in response to the present location of the vehicle being offset from the route, laterally to one side of a centerline of the second segment, the processor expands the second width, only on the one side to the centerline of the second segment, from the present location, along a line of the offset from the route, by one-half of a distance selected for the second width; and
a number of graphical indicators of a position of terrain on the display relative to the vehicle along the route.

13. The apparatus of claim 12, wherein at least one graphical indicator in the number of graphical indicators displayed in the vertical profile side view are terrain contour lines, wherein the contour lines represent the highest terrain elevation within the width.

14. The apparatus of claim 12, wherein the position relative to the vehicle along the route is one of: a first position, wherein the first position is on a right side, within the width, of the vehicle, a second position, wherein the second position is on a left side, within the width, of the vehicle, and a third position that is directly under, within the width, of the vehicle.

15. The method on the display of claim 1, the route further comprising a second segment, and the processor unit receiving a first width selection for the first segment, and a second width selection for the second segment.

16. The method on the display of claim 1, wherein the path further comprises a second segment comprising a second width, such that the second width and further comprising displaying, on the display, a vertical profile side view of terrain within the second width.

17. The computer program product of claim 9, wherein the first width differs from the second width.

18. The computer program product of claim 9, further comprising the computer program product configured such that in operation, the vehicle display presents a vertical profile side view of terrain within the second width.

19. The apparatus of claim 12, wherein the first width differs from the second width.

20. The apparatus of claim 12, further comprising processor unit configured such that in operation, the vehicle display, presents a vertical profile side view of terrain within the second width.

* * * * *